United States Patent Office 3,044,940
Patented July 17, 1962

3,044,940
PROCESS FOR ENZYMATIC SYNTHESIS OF DEXTRAN
Ulrich Behrens and Manfred Ringpfeil, Leipzig, Germany, assignors to VEB Serum-Werk Bernburg, Bernburg, Germany
No Drawing. Filed May 5, 1961, Ser. No. 107,945
Claims priority, application Germany Apr. 30, 1957
2 Claims. (Cl. 195—31)

This invention relates to a process for enzymatic synthesis of dextran and more particularly to the enzymatic synthesis of dextran having a molecular weight of controlled range. This is a continuation in part of application Serial No. 730,272, filed April 23, 1958, and now abandoned.

Dextran having a molecular weight of approximately 25,000 to 250,000 has become an important base material for blood volume extender solutions because of its osmotic and physiological properties.

The importance of blood supplies has already become so well known through the relevant literature that it is only necessary to refer to such literature at this point. Apart from this, however, simple supplementation of the circulated volume by synthetically prepared solutions, the osmotic and/or physiological properties of which are of such nature that they do no physiological harm in conjunction with the circulated fluid still present, is gaining increasing importance.

There are already numerous proposals to be found for this in literature and in patent literature, amongst which, apart from gelatin solutions, those of polyvinyl pyrrolidone and of dextran are of particular importance at present.

Particularly in the preparation of dextran, which is produced by the action of the enzyme dextran sucrase on sucrose result in a mixture of widely varying degrees of polymerisation products of which only a relatively small fraction is suitable for clinical use. Various proposals are known to raise, by hydrolytic depolymerisation in acid or alkaline media, or by mechanical effects (supersonic effects) and the like, the proportion which can be used clinically. Common to all proposals is an unsatisfactory yield with regard to the proportions which can be used clinically, and difficult and expensive methods.

More recent literature endeavors to overcome those shortcomings by preparing a pure dextran sucrase from suitable microorganisms and by employing the enzyme solution for polymerisation of sucrose to dextran in a solution which contains low-molecular-weight dextran as a primer or starter reagent for controlling the polymerisation. Of course, an increase in the yield could be achieved in relation to the older working methods but the preparation of a pure dextran sucrase solution satisfactorily capable of use as catalyst for the polymerisation is a significant difficulty.

Attempts have been made to overcome this difficulty by carrying out the synthesis of the dextran directly in the culture solution. However, the high molecular weight dextran which is synthesized in the inoculation cultures containing sucrose are found to interfere with the action of the primer such that only a part of the dextran formed lies in the desired molecular weight range.

An object of the present invention is the provision of a process for the preparation of dextran having a controlled range of molecular weight by direct inoculation of sucrose with a culture of microorganisms without isolation of the dextran-sucrase.

Another object is to provide a culture of enzyme-producing microorganisms free from primer material or starter reagent.

Other objects and many of the attendant advantages of this invention will be readily appreciated as the same becomes better understood by reference to the following detailed description when considered in connection with the specific examples of embodiments of the invention.

According to the present invention, therefore, a dextran of a definite molecular weight range, preferably clinical dextran, is produced by preparing an inoculation culture in a nutrient medium in which the only organic carbon sources present are those which cannot be used as primers or which have only insignificant primer action or which do not form any primers under the influence of the fermentation system for the biological synthesis of dextran, biologically synthesising dextran in a nutrient medium containing sucrose and suitable dextran as primer by using said inoculation culture as inoculum and isolating the resulting dextran having a definite molecular weight range from the fermented medium.

By the terms "primer" or "starter" as used herein are meant any compounds which have glucosyl-acceptor properties in respect of the polymerisation of dextran.

By the term "insignificant primer action" as used herein are meant any compounds which have glucosyl-acceptor properties in respect of the synthesis of di- and oligosaccharides, or which are in such a low concentration that they substantially do not interfere.

The preferred strains for producing dextran are *Leuconostoc mesenteroides* or *Leuconostoc dextranicum*.

The following examples are illustrative of the present invention; it should, however, be understood that the invention is not limited thereto:

EXAMPLE 1

(a) *Preparation of the Seed Solution*

A layer approximately 1 cm. high of a solution of the following composition is placed in a 500 ml. flatbottom flask.

Solution I:
  0.6% fructose
  10.0% yeast hydrolyzate (1 pt. yeast boiled in 5 pts. water)
  0.1% peptone
  0.5% $Na_2HPO_4 \cdot 12H_2O$
  0.1% KCl
  3.0% Agar This medium is inoculated with an active strain of *Leuconostoc mesenteroides* grown on a sucrose culture medium of conventional composition. Fermentation is continued at 25° C. for 24 hours whereupon 300 ml. of a nutrient medium of the following composition is added.

Solution II:
  0.2% proponal
  10% yeast hydrolyzate (1:5)
  0.1% peptone
  0.5% $Na_2HPO_4 \cdot 12H_2O$
  0.1% KCl
  pH 7

The fermentation is continued 24 hours at 25° C. and 7 liters of a culture medium of the same composition are inoculated with solution II. This solution (III) is then fermented 24 hours at 25° C. to form the seed solution.

(b) Synthesis of Dextran 7 liters of the fermented seed solution III are added to 63 liters of a sterile solution containing 7 kg. sucrose
    2.1 kg. primer dextran
    0.35 kg. $Na_2HOP_4 \cdot 12H_2O$
    0.7 kg. HCl
    7 liters yeast hydrolyzate (1:5)
    0.07 kg. peptone This solution is fermented at 25° C. until the pH reaches a stable value of approximately 4.

(c) Preparation of Clinical Dextran

When the fermentation is completed, methanol is added to the solution until the methanol content is 40%. The solution becomes turbid and the solids precipitated are filtered off. More methanol is added to raise the methanol concentration in the solution to 52%. The dextran precipitated thereby is separated from the supernatant solution. The precipitate is dissolved in water at room temperature or at 90° C. and is again fractionally precitated at room temperature with methanol as described above. The fraction obtained between 40% and 52% methanol is dissolved in hot or cold water as above and is filtered at a temperature between 60 and 70° C. In order to remove any ionic contaminants the solution may be passed over ion exchange columns or it may be fed directly to a vacuum evaporator, and the methanol is driven off by concentrating the solution to one third of its original volume. The concentration is adjusted to approximately 6% dextran solids, about 0.9% of ignited sodium chloride are added, and the solution is then ready to be filled into containers and to be sterilized for clinical use.

The vacuum concentration step may also be followed by spray drying which yields clinical dextran as a dry material.

The yield is 4.8 kg. of clinical dextran (on a dry basis), having an average molecular weight of 73,000.

EXAMPLE 2

An inoculum is taken from a stock culture of *L. mesenteroides* which has been fermented 48 hours at 25° C. on a medium containing 10.0% sucrose
10.0% yeast hydrolyzate (1 pt. yeast, 5 pts. water)
0.1% peptone
0.5% $Na_2HPO_4 \cdot 12H_2O$
0.1% KCl
2% agar The inoculum is transferred to a nutrient medium based on agar and a carbohydrate, but free of sucrose and of other primer-generating substances having the following composition.

Solution I:
    0.5% fructose
    10.0% yeast hydrolyzate
    0.1% peptone
    0.5% $Na_2HPO_4 \cdot 12H_2O$
    0.1% KCl
    2.0% agar After fermentation at 25° C. for 24 hours, an inoculum is transferred to a nutrient solution for propagation of the microorganisms having the following composition.

Solution II:
    0.5% citric acid
    10.0% yeast hydrolyzate
    0.1% peptone
    0.5% $Na_2HPO_4 \cdot 12H_2O$
    0.1% KCl
    pH 7

Fermentation is conducted at 25° C. for 24 hours and the fermented solution II is added to ten times the amount of the same nutrient solution to form solution III which is again fermented 24 hours at 25° C. The fermented solution III which is the final seed solution is mixed with ten times by volume of the sucrose synthesis solution which has the following composition:

10.0% sucrose
    10.0% yeast hydrolyzate
    0.1% peptone
    0.5% $Na_2HPO_4 \cdot 12H_2O$
    0.1% KCl
    pH 7

After approximately 24 hr. the fermentation is completed. The liquor containing native dextran of extremely high molecular weight may be further processed for recovery and purifying as described above.

EXAMPLE 3

Bacterial cells are taken from a stock culture of *L. mesenteroides* on the following agar medium 5.0% saccharose
    0.5% $Na_2HPO_4 \cdot 12H_2O$
    0.1% KCl
    0.1% peptone
    1.0% yeast hydrolyzate
    Aqua destillata to 100
    pH 7, adjusted with KOH The cells are rinsed off with physiological NaCl solution and centrifuged. After decantation, the cells are again taken up with NaCl solution. This procedure of rinsing is repeated, until no more dextran can be precipitated from the cell suspension. Two washing operations are usually sufficient.

The cell suspension is then inoculaed into a synthesis solution of the following composition 10.0% saccharose
    2.0% primer dextran, M.W. 20,000
    0.5% $Na_2HPO_4 \cdot 12H_2O$
    0.1% KCl
    0.1% peptone
    1.0% yeast hydrolyzate
    pH 7
    Aqua destillata to 100

The synthesis is completed when the pH is down to 3.9 Dextran is worked up for clinical purposes as above described.

EXAMPLE 4

A very small quantity of mucus from a culture of *L. dextranicum* or *L. mesenteroides* is spread out on a nutrient medium which covers the bottom of a flask and has the following composition.

Nutrient medium:
    3.0% agar
    0.5% fructose
    0.5% $Na_2HPO_4 \cdot 12H_2O$
    0.1% KCl
    0.1% peptone
    1.0% yeast hydrolyzate
    pH 7
    Aqua destillata to 100

After vigorous propagation of colonies, the flask is filled up with the following.

Nutrient seed solution:
    0.5% propanol
    0.5% $Na_2HPO_4 \cdot 12H_2O$
    0.1% KCl
    0.1% peptone
    1.0% yeast hydrolyzate
    pH 7
    Aqua destillata to 100

When maximum turbidity is reached, this solution is added to a synthesis solution of the composition described in Example 3 in the ratio 1:10.

After the pH value has dropped to 3.9, the synthesis is completed. Working up is done by known methods for dextran.

The propanol or the citric acid of the foregoing examples may be replaced by other organic compounds as a source of carbon for the propagation of the *L. mesenteroides* or *L. dextranicum* in the stepwise propagation process of the invention which aims at elimination of primer substances and primer-generating substances from the culture.

A number of such suitable sources of carbon are listed below in Table 1 together with the yields of dextran obtained by their use in the process outlined in Examples 1 and 2. The yield obtained with 10% sucrose is shown for comparison purposes and demonstrates the superiority of the process of the invention.

TABLE 1

Carbon source in nutrient solution:    Yield of dextran, percent
- 0.5% citric acid _____ 3.26
- 0.5% acetic acid _____ 3.58
- 0.5% lactic acid _____ 3.73
- 0.5% tartaric acid _____ 3.55
- 0.5% ethanol _____ 3.78
- 0.5% propanol _____ 3.82
- 10.0% sucrose _____ 2.54

The carbon sources of the invention not only increase the yield of dextran, but they practically eliminate the formation of dextran of high molecular weight which is not suitable for clinical use. The results shown in Table 2 were obtained by seeding a 10% sucrose solution to which is added 2 or 3% primer for dextran synthesis with seed solution prepared by the method illustrated in Example 1 at a ratio of 1:10, using sucrose and acetic acid respectively as a source of carbon.

TABLE 2

| Carbon Source | Primer, Percent | Clinical Fraction, grams/100 ml. | High M.W., g./100 ml. | Fraction, Percent |
|---|---|---|---|---|
| 10% Sucrose | 2 | 2.0 | 1.6 | 44 |
| 0.5% Acetic Acid | 2 | 6.3 | 0 | 0 |
| 10% Sucrose | 3 | 3.0 | 1.4 | 32 |
| 0.5% Acetic Acid | 3 | 7.7 | 0 | 0 |

It is apparent that many other non-toxic organic compounds may be employed as sources of carbon in the microorganism-propagating nutrient solutions of the invention which compounds will fulfill the requirement of not acting as primers and not generating primer substances, but of propagating *L. mesenteroides* or *L. dextranicum* without weakening its enzyme-producing ability.

Examples of substances which either act as primers themselves or which form primers in contact with a culture of *L. mesenteroides* or *L. dextranicum* include generally polymers of glucose having α-1,6 bonds, isomaltose, panose, and their homologs, α-methyl glucose, and sucrose.

The seed solution of the invention is made to act upon a sucrose solution under proper conditions with or without the addition of primer dextran of low molecular weight. The results obtained by the seed solution of the invention with varying amounts of a primer dextran are shown in Table 3 which also indicates the extremely high yields of clinical dextran obtainable by the process of the invention.

TABLE 3

| Sucrose | Primer | Total Dextran, Percent | Dextran Formed | Percent Yield on Basis of Available Glucose |
|---|---|---|---|---|
| 10 | 0 | 3.42 | 3.42 | 73 |
| 10 | 1 | 5.22 | 4.22 | 90 |
| 10 | 2 | 6.00 | 4.00 | 85 |
| 10 | 3 | 6.92 | 3.92 | 83 |
| 10 | 4 | 7.85 | 3.85 | 82 |
| 10 | 5 | 9.24 | 4.24 | 90 |

It will be seen from Table 3 that the process of the invention gives exceptionally high yields of clinically useful dextran fractions by using the cell culture itself, not the isolated enzyme, as the seed for performing the synthesis. The microorganisms are passed through a multiplicity of culture stages designed to maintain the virulence of the microorganisms while eliminating all primer substances and primer-generating substances. The enzymatic synthesis step itself, therefore, is perfectly controlled as to the presence of polymerization-directing primer substances. The method of the invention permits the use of high sucrose concentrations in the synthesis step. The concentration of primer dextran employed is not critical and relatively high concentrations of primer may be used without impairing the yield of clinical dextran. The methods of the prior art employing a cell-free enzyme solution for the synthesis are sensitive to variations in concentration of both sucrose and primer. This broader range of permissible operating conditions is an important advantage of the process of the invention.

In the following, examples of controlled synthesis of dextran of different molecular weight are given by way of illustration:

A. The molecular weight of dextran to be reached is 40,000.

Synthesis solution:
    20.0% saccharose
    2.5% primer dextran (M.W. 10,000)
    0.5% $Na_2HPO_4.12H_2O$
    0.1% KCl
    0.1% peptone
    1.0% yeast hydrolyzate
    pH 7
    Aqua destillata to 100
    Yield of fermentation on the average 80% of theoretical value (M.W. 40,000)

B. The molecular weight of clinical dextran to be reached is 75,000.

Synthesis solution:
    10.0% saccharose
    2.0% primer dextran (M.W. 25,000)
    Other ingredients as in A
    Yield of fermentation on the average 90% of theoretical value (M.W. 75,000)

C. The molecular weight of dextran to be reached is 150,000.

Synthesis solution:
    10.0% saccharose
    1.0% primer dextran (M.W. 30,000)
    Other ingredients as in A
    Yield of fermentation on the average 85% of theoretical value (M.W. 150,000)

D. The molecular weight of dextran to be reached is 300,000.

Synthesis solution:
    10.0% saccharose
    1.3% primer dextran (M.W. 75,000).
    Other ingredients as in A
    Yield of fermentation on the average 75% of theoretical value (M.W. 300,000)

E. A maximum molecular weight of dextran (technical) is to be reached.

Synthesis solution:
    7.5% saccharose
    No primer dextran
    Other ingredients as in A
    Yield of fermentation on the average 90% of theoretical value While the process of the invention has been illustrated in its application to the enzymatic synthesis of clinical dextran having a molecular weight range substantially between 25,000 and 250,000, it will be obvious to those skilled in the art that dextrans of other predetermined molecular weight ranges may be preferentially or even selectively produced by elimination of all primers (technical dextran above) or by the use of suitable primer substances under appropriate conditions of fermentation together with the seed solution of the invention.

While Leuconostoc mesenteriodes and Leuconostoc dextranicum are the microorganisms recited in the specific examples given, it will be understood that other microorganisms may be employed to advantage with the process of the invention. For example species of a number of genera including Streptococcus, Streptobacterium, Acetobacter, and Betabacterium.

While the invention has been described with particular reference to specific embodiments, it is to be understood that it is not limited thereto, but is to be construed broadly and restricted solely by the scope of the appended claims.

What is claimed is:

1. A process for enzymatic synthesis of dextran of controlled molecular weight range by the action of microorganisms selected from the group consisting of active strains of Leuconostoc mesenteroides and Leuconostoc dextranicum on an aqueous sucrose solution, said process comprising transferring an inoculum of a culture of said microorganisms to a nutrient propagating solution including a source of carbon for the propagation of said microorganisms, said source of carbon consisting of lower molecular aliphatic acids and lower molecular aliphatic alcohols, said solution being substantially devoid of primer substances and primer-generating substances, consisting of sugars selected from the group consisting of polymers of glucose having $\alpha$-1,6 bonds, isomaltose, panose, homologs of the same, $\alpha$-methyl glucose, and sucrose, fermenting said nutrient propagating solution, and transferring an inoculum from said nutrient propagating solution to said aqueous sucrose solution, which contains primer substances, for further fermentation therein, and recovering dextran from the nutrient solution by fractional precipitation with a lower aliphatic alcohol.

2. A process for enzymatic synthesis of clinical dextran by the action of Leuconostoc mesenteroides on an aqueous sucrose solution, said process comprising transferring an inoculum of a culture of an active strain of Leuconostoc mesenteroides to a nutrient propagating solution including a source of carbon for the propagation of said Leuconostoc mesenteroides, said source of carbon consisting of lower molecular aliphatic acids and lower molecular aliphatic alcohols, said solution being substantially devoid of primer substances and primer-generating substances, consisting of sugars selected from the group consisting of polymers of glucose having $\alpha$-1,6 bonds, isomaltose, panose, homologs of the same, $\alpha$-methyl glucose, and sucrose, fermenting said nutrient propagating solution, transferring an inoculum from said nutrient propagating solution to said aqueous sucrose solution, which contains primer substances, for further fermentation, and recovering dextran from the nutrient solution by fractional precipitation with a lower aliphatic alcohol.

References Cited in the file of this patent
UNITED STATES PATENTS
2,724,679    Tsuchiya _____ Nov. 22, 1955

OTHER REFERENCES

Journal of Bacteriology, vol. 64, No. 4, pp. 521 to 526 (1952).